UNITED STATES PATENT OFFICE.

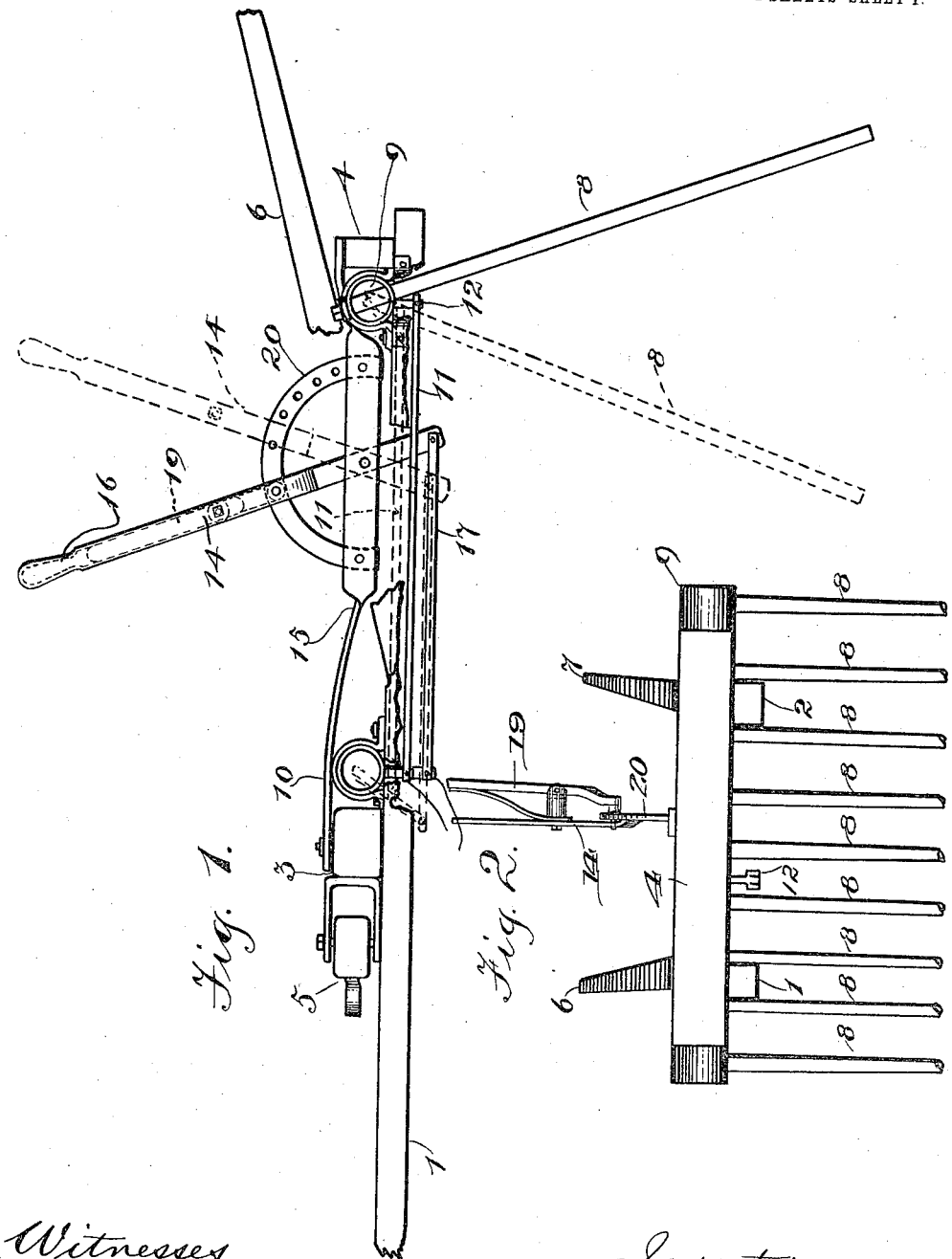

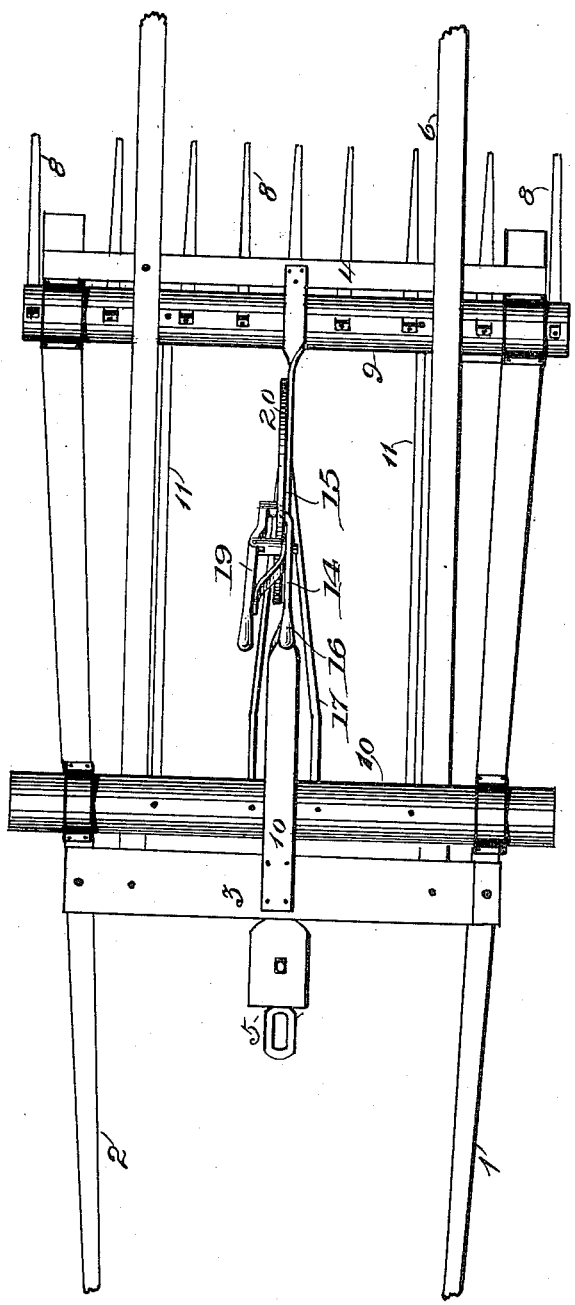

ANTONIO B. MEZZA, OF PLEASANTON, CALIFORNIA.

RAKE.

1,013,556.  Specification of Letters Patent.  Patented Jan. 2, 1912.

Application filed September 10, 1908. Serial No. 452,507.

*To all whom it may concern:*

Be it known that I, ANTONIO B. MEZZA, a citizen of the United States, residing at Pleasanton, in the county of Alameda and State of California, have invented a new and useful Improvement in Rakes, of which the following is a specification in such full and clear terms as will enable those skilled in the art to construct and use the same.

My invention relates to rakes, and particularly to rakes that are adapted to be drawn by horses, and perform their function by means of teeth set at an angle with the horizontal other than a right angle, and which is adapted to rake hay into piles to be afterward gathered.

The object of my invention is to provide a new rake of the character described, in which the operation of raking into piles may be readily performed, and when each pile is made, to pass the rake over it readily. I accomplish my object by the means illustrated in the accompanying drawing, of which—

Figure 1 is a side elevation of my rake, with part broken away; and Fig. 2 a rear elevation thereof. Fig. 3 is a plan view of my rake.

The same numeral of reference is applied to the same part in both the views.

The draft bars 1, 2 are extended the full length of the rake, so as to serve both as harnessing means, and supporting frame for the apparatus. Braces 3 and 4 are provided joining said bars and forming a rigid frame.

Swingletree 5 serves for the attachment of the horse to my rake, and the rake is guided by the handles 6 and 7.

The teeth 8 are rigidly fixed to the cylinder 9, which is rotatable in bearings secured to the frame aforesaid. I provide also a second cylinder 10, similarly secured to said frame, and between cylinder 9 and cylinder 10 I provide a link 11, which connects the arms 12 and 13 dependent therefrom.

A lever 14 is mounted on a supporting piece 15 fixed to the frame of my device, having a handle 16; and a link 17 from said lever joins the same with a second arm 18 depending from cylinder 10. Therefore, when lever 14 is moved backward or forward, teeth 8 are moved to vary the angle they make with the longitudinal axis of my machine. The full lines show their position when the rake is passing over a pile of hay raked into the required quantity; the dotted lines show the position of the teeth when the machine is performing the operation of raking the hay into piles.

A latch 19 is provided on lever 14, which engages holes in arc segment 20 for holding the teeth in any desired position.

The use of two rollers arranged as I have shown them in the drawing and explained in this specification, enables the operator to reverse the position of the teeth with greater ease than would occur if only one cylinder directly attached to lever 14 were used.

Having described my invention what I claim as new and desire to secure by Letters Patent of the United States, is:

In a rake, the combination with a rotatable cylinder, and teeth rigidly fixed thereto, of a second rotatable cylinder, a reversing lever, a link between said second cylinder and said lever, and a link between said first cylinder and said second cylinder.

In testimony whereof I have set my hand this 31st day of August A. D. 1908, in the presence of the two subscribed witnesses.

ANTONIO B. MEZZA.

Witnesses:
J. R. PALMER,
L. J. BERRYESSA.

Copies of this patent may be obtained for five cents each, by addressing the "Commissioner of Patents, Washington, D. C."